United States Patent [19]

Billarant et al.

[11] Patent Number: 4,802,939
[45] Date of Patent: Feb. 7, 1989

[54] METHOD FOR ATTACHING A FASTENING TAPE TO A MOLDED ARTICLE

[75] Inventors: Patrick J. Billarant; Bruno Queval, both of Charlotte, N.C.

[73] Assignee: Aplix, S.A., Paris, France

[21] Appl. No.: 93,801

[22] Filed: Sep. 4, 1987

Related U.S. Application Data

[62] Division of Ser. No. 676,951, Nov. 30, 1984, Pat. No. 4,693,921.

[30] Foreign Application Priority Data

Dec. 13, 1983 [FR] France ................................. 83 19926
Jun. 26, 1984 [FR] France ................................. 84 19933

[51] Int. Cl.⁴ ...................... A44B 21/00; A41H 37/00
[52] U.S. Cl. ...................................... 156/155; 156/245; 264/46.4; 264/46.7; 24/306; 24/444
[58] Field of Search ................... 428/43, 57, 120, 910, 428/100, 900; 24/306, 444; 297/DIG. 6; 264/46.7, 46.4, 313, 257, 509; 156/155, 245, 247, 289

[56] References Cited

U.S. PATENT DOCUMENTS

| | | | |
|---|---|---|---|
| 3,181,913 | 5/1965 | Guido et al. | 428/100 X |
| 3,408,705 | 11/1968 | Kayser et al. | 428/90 |
| 3,870,741 | 3/1975 | Kuhn | 264/46.4 |
| 3,940,524 | 2/1976 | Hoppe et al. | 428/86 |
| 4,470,857 | 9/1984 | Cassalou | 156/245 |
| 4,499,130 | 2/1985 | Questel et al. | 428/42 |
| 4,563,380 | 1/1986 | Black et al. | 264/46.7 X |
| 4,617,214 | 10/1986 | Billarant | 24/306 X |
| 4,710,414 | 12/1987 | Northrup et al. | 264/46.7 X |

FOREIGN PATENT DOCUMENTS 1601166 9/1970 France .
2423666 11/1979 France .
2463870 2/1981 France .
2466330 4/1981 France .

Primary Examiner—Michael W. Ball
Assistant Examiner—Jeff H. Aftergut
Attorney, Agent, or Firm—W. Thad Adams, III

[57] ABSTRACT

A fastening tape (4) is attached to a molded item (2) such as a seat cushion with a face of gripping hooks (5) turned outwardly to hold a seat cover (3) having complementary fastening member thereon. The tape (4) is molded into the seat cushion (2) during the molding process. Since a liquid molding substance is used, the hooks (5) on the tape (4) are covered with a thin plastic film (17) which prevents the molding liquid from contaminating and clogging the hooks (5). In one embodiment, the film (17) has a relatively low disintegration temperature whereby the heat applied to the mold to cure the cushion (2) disintegrates the film (17) after the cushion has cured, leaving the exposed hooks (5) unclogged and ready for use. In another embodiment, film (17) has a relatively high disintegration temperature and is removed in a separate step subsequent to the molding procoess by additional heat, such as an open flame.

9 Claims, 2 Drawing Sheets

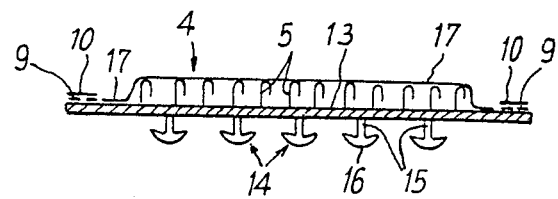
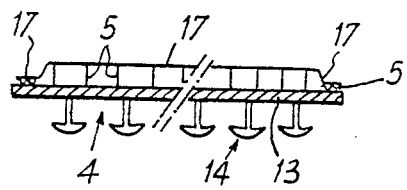
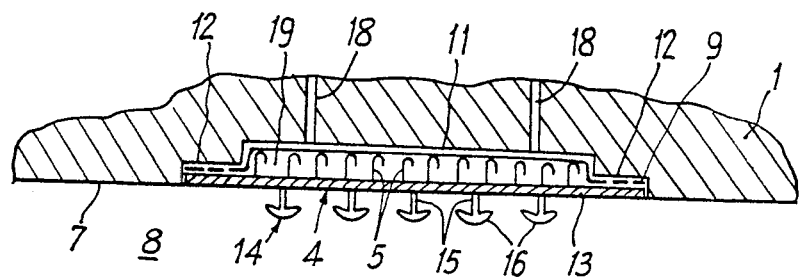
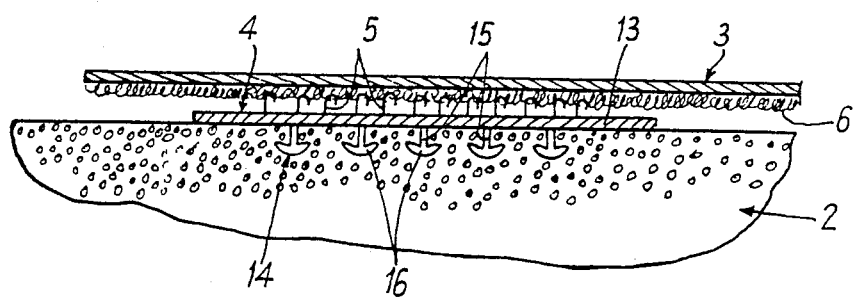

METHOD FOR ATTACHING A FASTENING TAPE TO A MOLDED ARTICLE

This application is a divisional of application Ser. No. 676,951, filed on Nov. 30, 1984, now U.S. Pat. No. 4,693,921.

TECHNICAL FIELD AND BACKGROUND OF THE INVENTION

The invention relates to the attaching of a fastening member, especially a velcro-like, self-gripping tape having gripping means such as hooks on one side to an article to be molded by its other side.

More specifically, the invention relates to attaching a tape of this type to a molded foam article such as an automobile seat or backrest. The tape is designed to hold, by its gripping means, an article such as a seat cover equipped with complementary gripping means.

The invention also relates to a self-gripping tape designed to be attached to an article to be molded during the molding operation.

When the tape is to be attached to such an article by prior art means during molding, the tape is first put inside the mold against the internal surface of the molding cavity to which it adheres temporarily.

The tape is held in place before and during molding, in a satisfactory manner, by various means such as temporary bonding or by magnetic or mechanical means.

However, a difficulty not yet resolved quite satisfactorily is to prevent the liquid molding material, prior to its final chemical or physical form, from penetrating between the internal surface of the mold and the tape itself, clogging the gripping hooks turned to the outside of the mold and inhibiting their gripping power.

The main purpose of the invention is to resolve this difficulty in a satisfactory technical and economical manner.

SUMMARY OF THE INVENTION

The tape according to the invention has a base of which one face is equipped with gripping means turned toward the outside of the mold. The tape lays against the internal surface of the mold along a marginal and peripheral area devoid of gripping means. Between the internal surface of the mold and the base having the gripping means, a thin continuous protective film covers the gripping means and extends to the marginal area to create a sealed area protecting the gripping means during molding.

Preferably, the edge of the protective film is recessed from the edge of the base, so that the base may be directly stuck to the internal surface of the mold.

Still preferably, the tape is stretched and, on both small extremities, it receives and holds the corresponding ends of the protective film by bonding, more particularly by ultrasonic welding. The gripping means are, in this area, crushed between the face and the film.

According to the invention, a specific method for attaching such tape during the molding operation onto the article to be molded is characterized in that the tape equipped with the protective film is placed into the molding cavity, the molding operation is executed at a temperature which does not affect the protective film and the film is removed after the molding material has stabilized chemically and physically.

According to one embodiment, the protective film is made of a material which degrades at a temperature which is greater than that at which the molding material stabilizes. Because heating is progressive during the molding operation, as long as the molding material is still fluid, it cannot penetrate between the base of the tape and the non-degraded protective film. After the material has stabilized, the film degrades and disappears at least partially under the effect of the rising temperature and uncovers the gripping means.

The type of protective film is chosen according to the characteristics of the molding material.

Thus, according to a preferred method, the item is cold foam molded, i.e., a foam setting from approximately 50° C. (polyether for example). A polyolefin film can also be used, more particularly a rigid or flexible polyethylene, which degrades from 100° C., or also cellulose acetate which degrades from 60° C.

The protective film is very thin, in the order of a few hundredths of millimeter (0.02 mm for example) and it shrinks as it degrades, so that the products of degradation take up a very small volume and are incapable of appreciably reducing the gripping power, even if it became caught between the gripping elements.

The thermal destruction of the protective film may be done either as part of the molding cycle, in its final phase, or after molding, i.e. after the molded item has been removed from the mold and, possibly, cooled. In this case the destruction is achieved, for example, by brief heating with a flame.

According to a second embodiment of the process, the temporary protective film is stuck by its edges at least in the longitudinal marginal areas of the side, or face, of the base having the gripping means. These areas are void of the gripping means and the film can be simply pulled-off of the face after molding in order to uncover the gripping means.

The removal of the film may be done by ungluing, or by division of the film at the junction of the stuck parts and the rest of the film. This division may also be done by tearing or cutting.

The initial glueing of the film may be done either with the application of an adhesive, or through physiochemical action, more particularly by ultrasonic welding with crushing of the gripping means in the glueing areas.

A fairly rigid shim, metallic for example, may be placed advantageously between the center non-adhesive area of the film and the top of the gripping means which it covers. The purpose of this shim is, on the one hand, to stiffen the composite assembly made of the tape and the film for its introduction into the mold and, on the other hand, to help the removal of the film after molding. Another use of the shim, when it is made of magnetic material, is to hold the tape in the mold with the help of magnets designed into the mold.

Advantageously, the film is also stuck, in the same fashion, across the ends of the tape.

The method for attaching the above described tape onto an item to be molded without thermal destruction of the film is as follows:

stick the temporary protection film by its edges at least in the longitudinal marginal areas of the face of the base having gripping elements, these areas being void of said elements;

fit the tape thus protected into the mold;

complete the molding operation;

remove the assembly made of the molded item with the tape attached to it; and remove the film of said face of the tape in order to uncover the gripping elements.

BRIEF DESCRIPTION OF THE DRAWINGS

The invention will be better understood with the following description and by referring to the accompanying drawings in which:

FIG. 1 is a cross-sectional view of a tape according to a first embodiment of the invention;

FIG. 2 is a longitudinal broken-out section of the ends of the tape in FIG. 1;

FIG. 3 is a view like FIG. 1 and shows the tape attached to the inside face of the mold, before molding;

FIG. 4 is a view like FIG. 1 and shows the finished molded item which has a cover gripping tape.

DESCRIPTION OF THE PREFERRED EMBODIMENT

Figure 5:
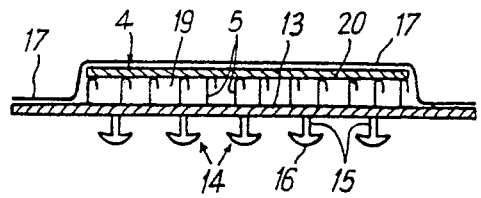
FIGS. 5 to 8 are views similar to FIGS. 1 to 4, respectively, referring to a second embodiment of the invention.
Figure 6:
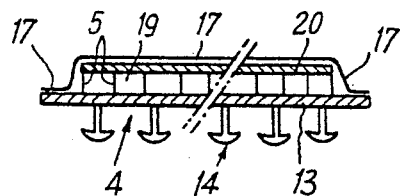
Figure 7:
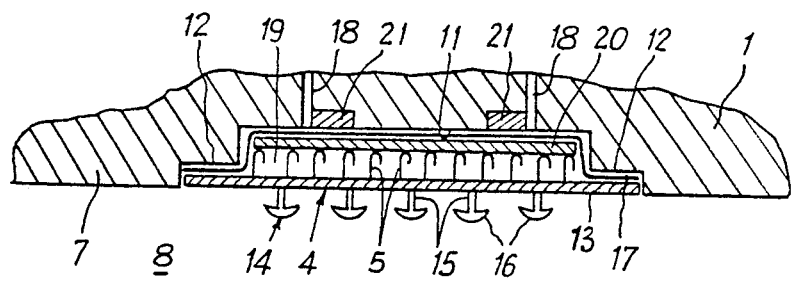
Figure 8:
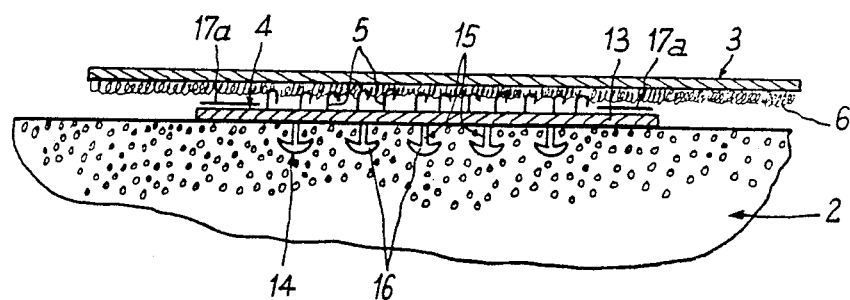

Referring now specifically to the drawings, FIGS. 3 and 7 are partial views of a mold 1, in aluminum for example, for the molding of an item 2, shown in FIGS. 4 and 8. This molded item 2 is, in the preferred embodiment method of the invention, a seat or backrest made of polyurethane foam, of the polyether type, for motor vehicle seats.

The item is designed to receive a cover 3, (FIGS. 4 and 8), such as a seat cover. The molded item 2 holds cover 3 by means of a fastening member, which comprises a tape 4 which is firmly attached to molded item 2 and which, on its face turned toward cover 3, has gripping means, in the shape of hooks 5, for example, designed to cooperate with the back side of cover 3 which has, for this purpose, a loose fibrous non-woven patch 6.

By known means, tape 4 is attached to molded item 2, onto the external face of the latter, during the molding operation itself. To this effect, referring to FIG. 3, tape 4 is attached temporarily onto the internal face 7 of molding cavity 8 provided in mold 1. For such fixation, tape 4, on its external face having gripping hooks 5, has two longitudinal marginal areas devoid of hooks 5 and is coated with an adhesive 9 (FIGS. 1–4) protected by film 10 designed to be removed when applying tape 4 onto the inside surface 7 of the mold. As described further in relation to the method of embodiment of FIGS. 5 to 8, tape 4 may be held through magnetic means by magnets embedded into the wall of the mold.

To accommodate tape 4, mold 1 has a cavity 11 (FIGS. 3 and 7) to receive hooks 5 and, possibly, on each side of this cavity, two small lateral cavities (12) to receive the marginal areas of tape 4. These areas, if they are adhesive coated, are cleared by the peeling-off protective film 10. The depth of the cavity or main groove 11 is such that hooks 5 may come and rest against its bottom and that, if side cavities 12 are provided, the face of 13 opposite the one with the gripping hooks 5 are flush with the inside face of mold 1. Cavities or side grooves 12 have a depth roughly equal to the thickness of tape 4. In this way, face 13 of tape 4 opposite the one with the hooks 5 is flush with surface 7. Furthermore, tape 4 is held against mold 1, on the one hand, through the side areas resting in cavities 12 and, on the other hand, if needed, in the center, through hooks 5 resting in the bottom of cavity 11. Thus, during foaming of the molding material, the resulting pressure against tape 4 does not create any deformation of the latter.

Since the face 13 of tape 4 turned toward the inside of the mold is level with it, this base protrudes, on finished item 2, as seen in FIGS. 4 and 8.

To insure perfect bonding of tape 4 with the molding material, anchoring elements 14 may be provided which protrude from face 13 toward the inside of mold 1 approximately at a right angle. Each anchoring element comprises a stem or foot 15 with a free end away from face 13 with a flared head 16. Head 16 may have any appropriate shape.

As a variation, anchoring elements 14 could be replaced with any appropriate structure, for example, a jersey, screen or same helping to anchor the molding material.

In order to prevent, during the molding operation, the molding material, when it is still in the liquid stage, from penetrating between the hooks 5 and becoming attached there, thus reducing the gripping power of hooks 5, a thin protective film 17 is provided (FIGS. 1 to 3 and 5 t 8) which covers the hooks 5 and which extends between the marginal areas of the tape 4 on its whole length.

Film 17 may be attached to face 13, on the marginal longitudinal areas, by any appropriate means, by adhesive coating for example, or by welding, more particularly by ultrasonic welding with crushing of the hooks 5 in the glueing areas. This latter technique should preferably be used since it permits the crushing of one or two rows of hooks 5 during the welding operation for attaching the film 17 to the tape 4. For glueing the tape 4 to the mold, because of the stiffness and the narrowness of the base, it is possible to omit the adhesive on the small sides. For wide tapes for example, it could be considered to level the tape 4 by removing a few rows of hooks 5 and attaching the edge of film 17 as on the long sides.

In the embodiment FIGS. 1 to 4, film 17 stops short of the opposing longitudinal sides of face 13, so as to leave a free border for adhesive 9 and its protective film 10.

According to the alternate shown on FIGS. 5 to 8, in which film 17 reaches up to the outside contour of tape 4, tape 4 is not glued to mold 1 but is held magnetically, as described hereinafter.

According to a characteristic of the invention, film 17 is made of a material which degrades physically and chemically at a temperature above that at which the molding product sets physically and chemically.

For example, if molded article 2 is in a polyether type foam, in which the foam sets around 50° C. (cold process), a polyolefin film 17 may be used. Otherwise, a flexible or rigid polyethylene, which degrades from 100° C., or a cellulose acetate which degrades from 60° C. may be used.

Film 17 is very thin, in the order of a few hundredth of a millimeter, 0.02 mm for example.

Prior to being inserted into mold 1 (FIGS. 1 and 2), tape 4 is covered with film 17 which encloses and protects hooks 5, like an envelope or a cocoon.

When tape 4, with its film 17, is placed into the mold (FIG. 3), it is temporarily held by adhesive 9, or any other like means. Hooks 5 are covered with film 17 and extend into cavity 11 having vents 18.

During the molding process, the liquid molding material is introduced into mold cavity 8 and, as the temperature rises through controlled heating it gradually sets in its shape and at the same time in its chemical structure. While it is liquid or viscous, i.e., at relatively low temperature, film 17 remains intact as well as its liaison with face 13 and prevents any penetration of material into closed space 19 which it forms with face 13 and which encloses and protects hooks 5. Thus, the latter are protected as long as the molding material is fluid. As the temperature keeps on increasing, under external control, the material of film 17 starts to degrade. Given the thin thickness of film 17, this degradation results in a shrinkage, a known phenomenon, which results in an extremely small volume of residue material. This residue, even if it fell directly into hooks 5, is of a very small volume, incapable to sufficiently clog and appreciably or significantly diminish the gripping power of the hooks 5.

At the end of the molding process, film 17 is at least partially and generally fully degraded and destroyed. The product of the degradation falls, for the solid part, onto face 13, onto hooks 5 and onto cavity surface 11, so that, when unmolding, hooks 5 are fully free and can later grip cover 3 without requiring any extra and expensive cleaning operation.

Thus, thanks to the invention which provides for a film 17 creating a sealed enclosure, hooks 5 are safely protected against clogging by the molding material. According to a particular characteristic, this film is automatically destroyed through heat after the molding material has set.

According to another embodiment of the invention, the material of protective film 17 is not affected during the molding operation. The destruction of this film 17 is done later by chemical, mechanical or thermal means. In the latter, finished molded article 2, having tape 4 with its film 17, could, for example, be submitted to a brief and intense superficial heating, more specifically to a flame for the surface treatment of item 2, simultaneously to the thermal destruction of film 17.

According to alternate shown on FIGS. 5 to 8, a fairly rigid shim 20 is placed in space 19, between the top of hooks 5 and film 17. This shim has the same width (FIG. 5) and the same length (FIG. 6) as part of face 13 having hooks 5. This shim is a metal sheet of a few tenths of a millimeter thick. Preferably, it is made of a magnetic material, iron base sheet for example, so that it may be attracted by magnets 21 embedded into the bottom of cavity 11 of mold 1. This secures tape 4 during the molding operation (FIG. 7).

Shim 20, besides its possible use to hold the tape 4 into cavity 11, stiffens the composite assembly made of tape 4 itself and film 17 helping the positioning of this assembly into mold 1. Furthermore, after the molding operation, it helps in removal of film 17 from tape 4 anchored into molded item 2.

Removal of film 17 may be achieved either by unsticking of the marginal areas either by tearing or cutting. Unsticking is chosen if the adherence between film 17 and marginal areas of face 13 is not too strong; tearing off is chosen if it does not matter if a tongue of film 17a (FIG. 8) corresponding to the unremoved remainder of the film 17 possibly remains on each of the longitudinal marginal areas of the face 13. In both of the above cases, after film 17 has been notched on one of the small sides of tape 4, the superposed edges of the shim 20 and film 17 are manually grabbed and the assembly is progressively lifted, with a peeling action, which results in the removal of the film 17, with or without the marginal areas of the film initially glued to face 13. In these operations, the edges of the shim 20 help in the removal of the film 17. In case of a division of the film 17, the longitudinal edges of the shim 20 are in effect the two support or cutting edges along or near which tearing is done. In the third case, a cutting blade may be guided along the longitudinal edges of shim 20, or in the immediate vicinity of the glued marginal areas of the film 17 in order to get a very clean separation. After cutting, tongues 17a remain with clean edges. The same procedure may be applied to the short sides of the tape 4.

Prior to being inserted into mold 1 (FIGS. 1 and 2), tape 4 is covered with film 17 which encloses and protects hooks 5, in the manner of an envelope or a cocoon, in the enclosed space 19.

When tape 4, with its film 17, is placed into the mold (FIG. 7), it is held temporarily by the adhesive or the magnets 21, hooks 5 covered by film 17 extend into cavity 11, possibly equipped with vents 18.

During the molding operation, the liquid molding material is introduced into molding cavity 8 and, as the temperature rises, through controlled heating, it gradually sets in its form and at the same time in its chemical structure. During molding, film 17 prevents any penetration of the material into space 19. Hooks 5 are thus protected against penetration by the molding liquid.

Naturally, film 17 is chosen of a material which resists the molding temperatures.

At the end of the molding operation, item 2, with tape 4 and film 17 attached, is removed from mold 1, after which the film is removed as described above.

I claim:

1. A method for securing a fastening member to an article to be molded, said fastening member being of the type characterized by having a base carrying numerous rows of hook-like projections for mating, releasable engagement with a loose, fibrous patch to form a fastener assembly, said method comprising the steps of:
    (a) applying a thin, protective film to the fastening member to protect and sealingly enclose the hook-like projections around the entire periphery of the fastening member against leakage of molding liquid past the film onto the hook-like projections;
    (b) placing the fastening member in a mold in a position wherein the hook-like projections will be exposed on the surface of the completed molded article and introducing molding liquid to the mold;
    (c) curing the molding liquid to form a solid; and
    (d) removing the protective film from the fastening member after the molding liquid is cured to expose said hook-like projections for mating, releasable engagement with said patch.

2. A method according to claim 1 and including the additional step of continuously affixing peripheral edges of said protective film to peripheral edges of the base carrying the hook-like projections.

3. A method according to claim 1, wherein the step of removing the protective film comprises applying heat to the mold to cure the molding liquid into a solid and to disintegrate the protective film covering the hook-like projections after the molding liquid has solidified sufficiently to prevent leakage of the molding liquid into the area occupied by the hook-like projections.

4. A method for securing a fastening member to an article to be molded, said fastening member being of the type characterized by having a base carrying numerous rows of hook-like projections for mating, releasable engagement with a loose, fibrous patch to form a fastener assembly, said method comprising the steps of:
    (a) applying a thin, protective film to the fastening member to protect and enclose the hook-like projections;

(b) placing the fastening member in a mold in a position wherein the hook-like projections will be exposed on the surface of the completed molded article and introducing molding liquid to the mold;
(c) curing the molding liquid to form a solid at a temperature below which the protective film disintegrates;
(d) applying heat to the protective film subsequent to the molding process causing said film to disintegrate and exposing said hook-like projections for mating, releasable engagement with said patch.

5. A method according to claim 4, wherein the step of applying heat to the protective film comprises exposing the film to an open flame for a sufficient period of time to disintegrate said film without damaging said base or said hook-like projections.

6. A method according to claim 1 or 4, wherein the step of curing the molding liquid to form a solid comprises the step of cold setting the molded article.

7. A method according to claim 1 or 4, wherein said protective film is removed from said fastening member after the fastening member has been removed from the mold.

8. A method according to claim 7, wherein the protective film is detached by unsticking the fastening member from the mold.

9. A method according to claim 1, wherein the film is detached by cutting or tearing the film away from the fastening member.

* * * * *